US012785734B2

(12) United States Patent
Somashekar et al.

(10) Patent No.: US 12,785,734 B2
(45) Date of Patent: Nov. 3, 2026

(54) MITIGATION OF TRANSMITTED ENERGY ON SUBCARRIERS BY SELECTIVELY FILTERING POST-AMPLIFIED WAVEFORMS

(71) Applicant: T-MOBILE INNOVATIONS LLC, Overland Park, KS (US)

(72) Inventors: Sharath Somashekar, Leawood, KS (US); Deveshkumar Narendrapratap Rai, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 165 days.

(21) Appl. No.: 18/885,085

(22) Filed: Sep. 13, 2024

(65) Prior Publication Data

US 2026/0081629 A1 Mar. 19, 2026

(51) Int. Cl.
*H04B 1/04* (2006.01)
*H04B 1/00* (2006.01)
*H04L 5/00* (2006.01)

(52) U.S. Cl.
CPC ......... *H04B 1/0458* (2013.01); *H04B 1/0071* (2013.01); *H04B 1/0078* (2013.01); *H04L 5/0098* (2013.01)

(58) Field of Classification Search
None
See application file for complete search history.

(56) References Cited

U.S. PATENT DOCUMENTS 9,398,572 B2 * 7/2016 Zhu ........................ H04L 1/0033
11,184,037 B1 11/2021 Shattil
11,223,467 B2 * 1/2022 Fehrenbach ............ H04L 5/001
2011/0165848 A1 7/2011 Gorbachov et al.
2013/0242885 A1 * 9/2013 Zhu ........................ H04L 1/0033 370/329
2014/0038675 A1 2/2014 Khlat et al.
2016/0380592 A1 12/2016 Rajendran et al.
2019/0174506 A1 6/2019 Willis, III et al.
2021/0083635 A1 3/2021 Kim et al.
2021/0194515 A1 6/2021 Go et al.
(Continued)

FOREIGN PATENT DOCUMENTS

WO 2019/225970 A1 11/2019

OTHER PUBLICATIONS

International Search Report and Written Opinion received for PCT Patent Application No. PCT/US2025/045870, mailed on Nov. 26, 2025, 10 pages.
(Continued)

*Primary Examiner* — Pablo N Tran

(74) *Attorney, Agent, or Firm* — Shook, Hardy & Bacon L.L.P.

(57) ABSTRACT

Embodiments of the present disclosure are directed to systems and methods for mitigating energy transmitted on subcarriers in a communications network. For example, a signal intended for transmission may be allocated with blanked Physical Resource Blocks (PRBs) and non-blanked PRBs. In order to reduce residual energy transmission within the blanked PRBs, a compensating waveform that destructively interferes with the residual energy within the blanked PRBs can be generated and summed with the signal before amplification and final transmission to an intended recipient.

20 Claims, 6 Drawing Sheets

(56) References Cited

U.S. PATENT DOCUMENTS

| | | | | |
|---|---|---|---|---|
| 2022/0029761 | A1 | 1/2022 | Su et al. | |
| 2023/0031214 | A1 | 2/2023 | Gianinni et al. | |
| 2023/0074893 | A1 | 3/2023 | Zhang et al. | |
| 2023/0102171 | A1 | 3/2023 | Su et al. | |
| 2023/0171821 | A1 | 6/2023 | Timson | |
| 2023/0300867 | A1 | 9/2023 | Wang et al. | |
| 2024/0049149 | A1* | 2/2024 | Wigren | H04W 52/143 |
| 2024/0098719 | A1 | 3/2024 | Sienkiewicz et al. | |
| 2024/0107328 | A1* | 3/2024 | Ramalingam | H04L 5/0051 |
| 2024/0188145 | A1 | 6/2024 | Rajendran et al. | |
| 2024/0244532 | A1* | 7/2024 | Farhoodi | H04W 52/0261 |
| 2024/0405851 | A1 | 12/2024 | Somashekar et al. | |
| 2026/0025798 | A1 | 1/2026 | Alasti et al. | |

OTHER PUBLICATIONS

Non-Final Office Action received for U.S. Appl. No. 18/885,044, mailed on Jun. 5, 2026, 16 pages.

Notice of Allowance received for U.S. Appl. No. 18/885,254, mailed on Jun. 9, 2026, 8 pages.

Non-Final Office Action received for U.S. Appl. No. 18/885,229, mailed on Jun. 29, 2026, 12 pages.

* cited by examiner

MITIGATION OF TRANSMITTED ENERGY ON SUBCARRIERS BY SELECTIVELY FILTERING POST-AMPLIFIED WAVEFORMS

SUMMARY

The present disclosure is directed, in part, to mitigating energy transmitted on subcarriers in a communications network by selectively filtering post-amplified waveforms, substantially as shown and/or described in connection with at least one of the figures, and as set forth more completely in the claims.

According to various aspects of the technology, communication networks typically provide a range of services, including voice, text, and data transmissions to facilitate communication among users through, for example, base stations and/or user equipment. In modern communications networks, Physical Resource Block (PRB) blanking is used to help mitigate interference and improve network performance. However, despite the implementation of PRB blanking, residual energy transmission within the blanked PRBs continues to pose challenges for operators. This issue arises due to various factors, including spectral leakage, sidelobes from modulation techniques, and the imperfect performance (e.g., nonlinearity) of power amplifiers (PAS). These unwanted energy transmissions within the blanked PRBs can have detrimental effects on the communications network. They lead to increased interference, reducing the quality of service for users and potentially causing errors in data transmission. Furthermore, this interference can extend beyond the intended network, affecting other nearby communication networks operating in adjacent frequency bands. As a result, the efficiency and reliability of the entire communication ecosystem can become compromised.

To address the problem of residual energy transmission on blanked PRBs, post-amplified waveforms can be selectively filtered to reduce the unwanted energy transmissions. For example, by applying bandstop and/or bandpass filters to the amplified waveform, frequencies corresponding to blanked PRBs can be effectively attenuated while helping to ensure that the desires frequencies containing data intended for transmission (e.g., active or non-blanked PRBs) are allowed to pass through and be transmitted to an intended recipient. Selectively filtering using bandstop filters allows operators to reject the specific frequency ranges associated with blanked PRBs, preventing residual energy from these frequencies from propagating further. Alternatively, or additionally, bandpass filters can be used to allow only the frequencies corresponding to active PRBs to pass through. A dual filter approach may help ensure that any unwanted energy introduced or amplified by a power amplifier is subsequently removed while the desired range(s) of frequencies within the amplified waveform are preserved. Implementing such selective filtering after amplification helps to maintain signal integrity and optimize the efficiency of communications networks. Furthermore, this approach not only enhances the efficiency and reliability of the communications network but also minimizes interference with nearby communications networks operating in adjacent frequency bands.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

DETAILED DESCRIPTION

Figure 1:
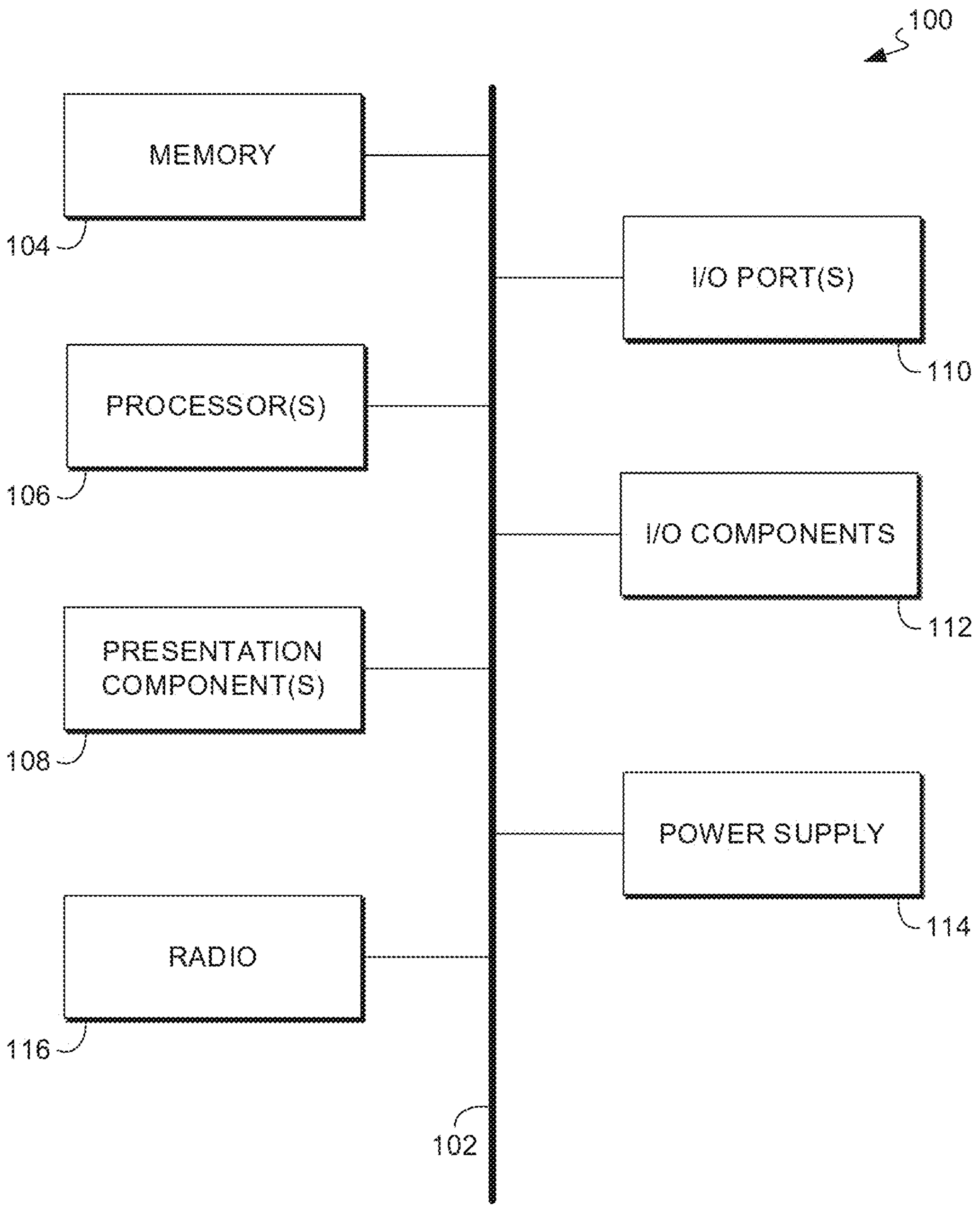
FIG. 1 illustrates an exemplary computing device for use with the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms can be found in Newton's Telecom Dictionary, (e.g., 32d Edition, 2022).

The example aspects and embodiments described in the present disclosure are provided within the context of a wireless telecommunication network for illustrative purposes. However, it should be understood that the principles and techniques discussed herein are not limited to wireless networks alone. The concepts and methodologies can be equally applied to other types of communication networks, including but not limited to wired, satellite, and optical networks. These alternative networks are capable of supporting the functionalities and applications described, and their use falls within the scope of the present disclosure.

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media that may cause one or more computer processing components to perform particular operations or functions.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions-including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

As used herein, the term "base station" or "cell" refers to a centralized component or system of components that is configured to wirelessly communicate (receive and/or transmit signals) with a plurality of stations (i.e., wireless communication devices, also referred to herein as user equipment (UE(s))) in a particular geographic area. As used herein, the term "network access technology (NAT)" is synonymous with wireless communication protocol and is an umbrella term used to refer to the particular technological standard/protocol that governs the communication between a UE and a base station; examples of network access technologies include 3G, 4G, 5G, 6G, 802.11x, and the like.

"User equipment" (UE), "user device," "mobile device," and "wireless communication device" are used interchangeably to refer to a device having hardware and software that is employed by a user in order to send and/or receive electronic signals/communication over one or more networks. User devices generally include one or more antennas coupled to a radio for exchanging (e.g., transmitting and receiving) transmissions with an in-range base station that also has an antenna or antenna array. In aspects, user devices may constitute any variety of devices, such as a personal computer, a laptop computer, a tablet, a netbook, a mobile phone, a smartphone, a personal digital assistant, a wearable device, a fitness tracker, or any other device capable of communicating using one or more resources of the network. User devices may include components such as software and hardware, a processor, a memory, a display component, a power supply or power source, a speaker, a touch-input component, a keyboard, and the like. In various examples or scenarios that may be discussed herein, user devices may be capable of using 5G technologies with or without backward compatibility to prior access technologies, although the term is not limited so as to exclude legacy devices that are unable to utilize 5G technologies, for example.

The term "radio unit" (RU) is used herein to refer to one or more software and hardware components that facilitate sending and receiving wireless radio frequency signals, for example, based on instructions from a base station. A RU may be used to initiate and generate information that is then sent out through the antenna array, for example, where the radio and antenna array may be connected by one or more physical paths. A RU may comprise such things as a Digital to Analog Converter (DAC), a Digital Signal Processor (DSP), an amplifier, an antenna array, and/or a controller (e.g., a selective filtering controller). Generally, an antenna array comprises a plurality of individual antenna elements. The antennas discussed herein may be dipole antennas having a length, for example, of ¼, ½, 1, or 1½ wavelengths. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

The term "Physical resource block" (PRB) is used herein to refer to a defined quantity of consecutive subcarriers in a frequency domain that is used for wireless transmission and wireless reception of waveform signals via antennas/antenna elements. In some instances, a physical resource block has a defined quantity of consecutive subcarriers in a frequency domain within one slot in a time domain (e.g., LTE). In other instances, a physical resource block has a defined quantity of consecutive subcarriers in a frequency domain independent of the time domain (e.g., 5G NR). In one example, one resource block has twelve consecutive subcarriers of a frequency domain, where one subcarrier corresponds to one resource element in the resource block. The bandwidth of various physical resource blocks is dependent on the numerology and subcarrier spacing utilized, which corresponds to the frequency bands as defined in kilohertz (kHz) and which determines the cyclic prefix of said block in milliseconds (ms). For example, 5G NR technology supports subcarrier spacing of 15, 30, 60, 120, and 240 kHz while LTE technology supports only one subcarrier spacing of 15 kHz. The physical resource blocks form bandwidth parts (BWP). The physical resource blocks discussed herein are compatible and usable in LTE, LTE-M, 3G, 4G, 5G, IoT, IIoT, NB-IoT, and similar technologies without limitation. For this reason, physical resource blocks are discussed herein in a network-agnostic manner, as the aspects discussed herein can be implemented within each of the different technology environments.

The term "bandpass filter" is used herein to refer to one or more hardware and/or software components used to selectively filter waveforms to allow a specific frequency range (e.g., a passband) to pass through while attenuating frequency ranges outside this range. Conversely, the term "bandstop filter" is used herein to refer to one or more hardware and/or software components used to selectively filter waveforms to attenuate a specific range of frequencies (e.g., a stopband) while allowing frequency ranges outside this range to pass through. In some aspects, the bandpass filter and the bandstop filter may be integrated into a single, multifunctional filtering component that operates together to selectively filter a post-amplified waveform.

By way of background, PRB blanking is an interference management technique employed in modern communication networks and may be employed at base stations and/or user equipment. In these networks, data transmission may be organized into resource blocks, each of which spans a specific number of subcarriers in the frequency domain and a certain number of symbols in the time domain. Efficient and effective management of these resource blocks is helpful for optimizing network performance and ensuring reliable communication. One of the purposes of PRB blanking is to reduce inter-cell and intra-cell interference, particularly in scenarios with both macro cell and small cells. In such environments, high-power macro cell transmissions can cause significant interference to nearby low-power small cells or user equipment. By strategically blanking certain PRBs, the network can lower interference in both the time and frequency intervals, allowing small cells and other low-power nodes to operate more effectively.

Despite the strategic implementation of PRB blanking to manage interference in communications networks, residual energy transmission within the blanked PRBs remains a persistent issue in real-world scenarios. This problem arises from several technical factors that complicate the ideal functioning of PRB blanking. For example, in practice, waveforms generated by a radio unit and intended for transmission are typically only filtered before being amplified. This approach may suffer from the finite response of filters and the inherent sidelobes generated by some modulation techniques, which could lead to spectral leakage where some energy spills into adjacent frequencies, including those designated as blanked PRBs. Moreover, power amplifiers (PAs), which are important for boosting the signal strength for transmission, often exhibit nonlinear behavior. This nonlinearity results in the generation of harmonics and intermodulation products that further contaminate the blanked PRBs with unwanted energy. Additionally, since amplifiers do not completely turn off, residual energy may still be transmitted on blanked PRBs even when the blanked PRBs carry no information. These imperfections in the amplification and modulation processes cause energy to be transmitted within the blanked PRBs, undermining the intended interference mitigation. For example, the interference levels may degrade the quality of service for users and lead to higher error rates and reduced data throughput. Furthermore, this interference may not be confined to the intended network alone but may also affect nearby communications networks operating in adjacent frequency bands, causing broader spectrum management issues. As a result, the efficiency and reliability of both the local network and the surrounding communication infrastructure may become compromised, highlighting the need for more effective solutions to address this issue.

To address the issue of residual energy transmission in blanked PRBs that may be accidentally introduced or amplified by power amplifiers, the present disclosure is directed to systems and methods for mitigating energy transmitted on subcarriers in a communications network by selectively filtering post-amplified waveforms. This approach may involve using a combination of bandstop and bandpass filters that operate to selectively filter a waveform after it has been amplified. These filters may work together to attenuate a specific frequency range associated with blanked PRBs while preserving and enhancing the desired frequencies of non-blanked PRBs (e.g., active PRBs). Such an implementation of post-amplification filtering helps ensure that any residual energy or interference introduced and/or exacerbated during amplification is reduced, improving overall signal quality and network performance. Furthermore, a controller (e.g., a selectively filtering controller) may be implemented to communicate and coordinate with a network scheduler and the new filters to manage the selective filtering process. For example, the scheduler may provide the controller with real-time data on PRB allocations, allowing the controller to determine which frequencies should be filtered. Based on this information, the controller may dynamically adjust the bandstop and bandpass filters to target the unwanted frequencies while allowing the desired signal components within the amplified waveform to pass through. Using such an intelligent controller, the precision of both filter types may be leveraged to maintain signal integrity, reduce interference, and enhance the efficiency and reliability of the communications network.

In some aspects, the controller may operate in close communication with the network scheduler, which may employ machine learning (ML) algorithms to predict interference patterns and optimize generation of destructive signaling dynamically. For example, based on the scheduler's instructions and/or data from a DSP, the controller can intelligently predict the appropriate waveform to destructively interfere with energy within the blanked PRBs. This destructive signaling may be performed before the amplification stage, helping ensure that no residual energy from these PRBs is amplified and transmitted.

Accordingly, a first aspect of the present disclosure is directed to a system for mitigating energy transmitted on subcarriers in a communications network. The system includes a radio unit and a network device comprising one or more processors. The system further includes a non-transitory computer-readable media configured to receive scheduling data associated with an amplified waveform generated by the radio unit. The media is further configured to determine, based on the scheduling data, that a first range of frequencies of the amplified waveform comprises blanked PRBs. The media is further configured to selectively filter the amplified waveform to attenuate the first range of frequencies. The media is further configured to transmit the filtered amplified waveform to an antenna array.

A second aspect of the present disclosure is directed to a non-transitory computer-readable media that, when executed, cause a user equipment comprising one or more processors to perform operations for mitigating energy transmitted on subcarriers in a communications network. For example, the computer-readable media is configured to receive scheduling data associated with a waveform. The media is further configured to determine, based on the scheduling data, that a first range of frequencies of the waveform comprises blanked PRBs and that a second range of frequencies of the waveform comprises non-blanked PRBs. The media is further configured to amplify the waveform using a power amplifier and then selectively filter the amplified waveform to allow the second range of frequencies to pass through.

A third aspect of the present disclosure is directed to a method for mitigating energy transmitted on subcarriers in a communications. The method includes generating a waveform comprising a first plurality of PRBs and a second plurality of PRBs. The method further includes amplifying the waveform using a power amplifier. The method further includes selectively filtering the amplified waveform such that the first plurality of PRBs is attenuated and the second plurality of PRBs passes through.

Referring to FIG. 1, an exemplary computer environment is shown and designated generally as computing device 100 that is suitable for use in implementations of the present disclosure. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 is generally defined by its capability to transmit one or more signals to an access point and receive one or more signals from the access point (or some other access point); the computing device 100 may be referred to herein as a user equipment (UE), wireless communication device, or user device, The computing device 100 may take many forms; non-limiting examples of the computing device 100 include a fixed wireless access device, cell phone, tablet, internet of things (IoT) device, smart appliance, automotive or aircraft component, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media of the computing device 100 may be in the form of a dedicated solid state memory or flash memory, such as a subscriber information module (SIM). Computer storage media does not comprise a propagated data signal.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

The radio 120 represents one or more radios that facilitate communication with one or more wireless networks using one or more wireless links. While a single radio 120 is shown in FIG. 1, it is expressly contemplated that there may be more than one radio 120 coupled to the bus 102. In aspects, the radio 120 utilizes a transmitted to communicate with a wireless telecommunications network. It is expressly contemplated that a computing device 100 with more than one radio 120 could facilitate communication with the wireless network via both the first transmitter and additional transmitters (e.g. a second transmitter). Illustrative wireless telecommunications technologies include CDMA, GPRS, TDMA, GSM, and the like. The radio 120 may carry wireless communication functions or operations using any number of desirable wireless communication protocols, including 802.11 (Wi-Fi), WiMAX, LTE, 3G, 4G, LTE, 5G, NR, VoLTE, or other VoIP communications. As can be appreciated, in various embodiments, radio 120 can be configured to support multiple technologies and/or multiple radios can be utilized to support multiple technologies. A wireless telecommunications network might include an array of devices, which are not shown as to obscure more relevant aspects of the invention. Components such as a base station or communications tower (as well as other components) can provide wireless connectivity in some embodiments.

Figure 2:
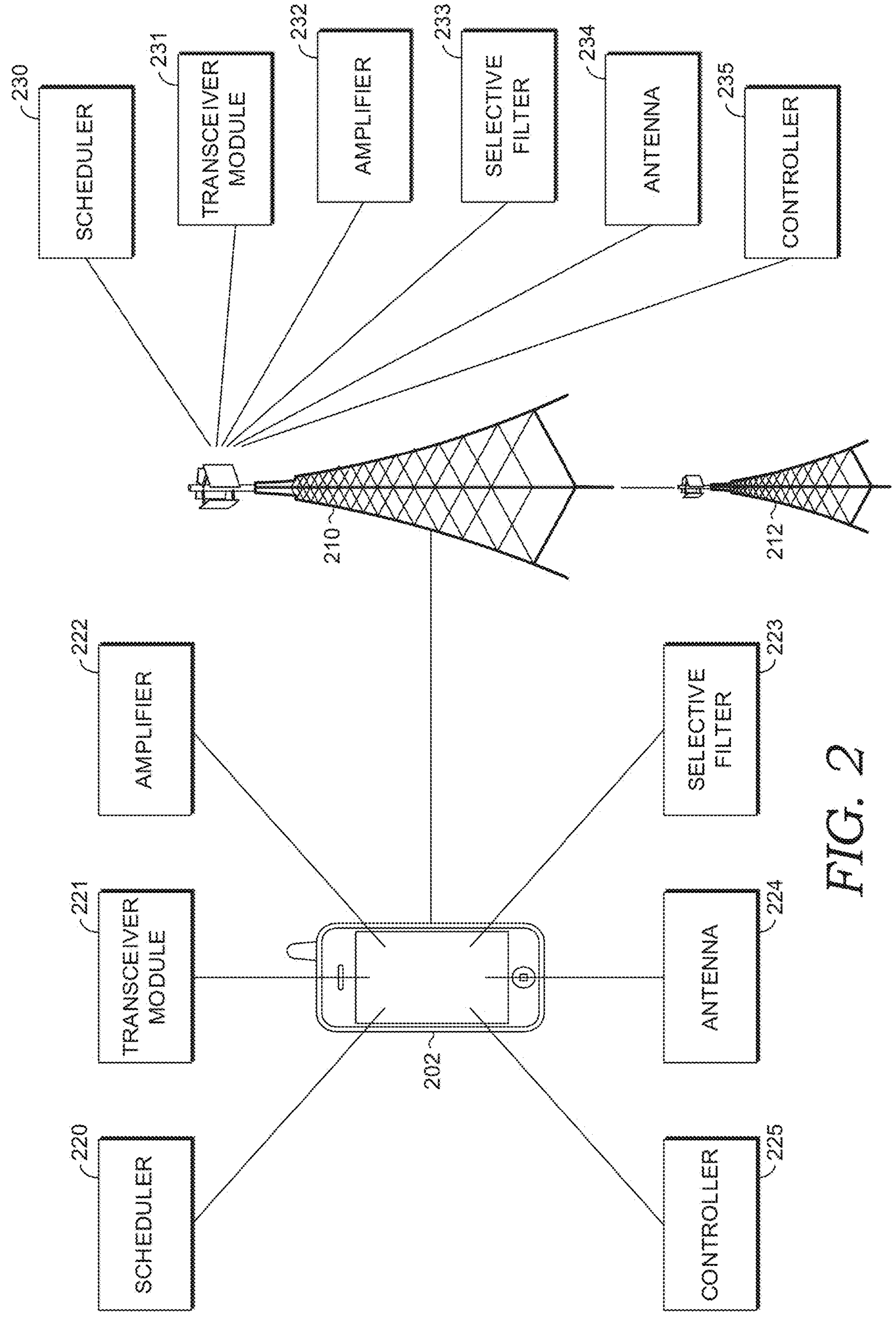
FIG. 2 illustrates a diagram of an exemplary network environment in which implementations of the present disclosure may be employed.

Referring now to FIG. 2, an exemplary network environment is illustrated in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 represents a high level and simplified view of relevant portions of a modern wireless telecommunication network. At a high level, the network environment 200 may generally be said to comprise one or more UEs, such as UE 202, one or more base stations, such as a first base station 210 and/or a second base station 212, though in some implementations, it may not be necessary for certain features to be present. For example, in some aspects, the network environment 200 may not comprise the second base station 212 (e.g., when the first UE 202 is transmitting toward the first base station 210) and/or may not comprise the first UE 204 (e.g., when the first base station 210 is transmitting toward the second base station 212). The network environment may include a number of routers, switches, and the like. The network environment 200 is generally configured for wirelessly connecting the first UE 202 to data or services that may be accessible on one or more application servers or other functions, nodes, or servers not pictured in FIG. 2 so as to not obscure the focus on the present disclosure.

The network environment 200 comprises the first UE 202, which is illustrated generally, and may take any number of forms, including a tablet, phone, or wearable device, or any other device discussed with respect to FIG. 1 and may have any one or more components or features of the computing device 100 of FIG. 1. In some aspects, the first UE 202 may not be a conventional telecommunications devices (i.e., a device that is capable of placing and receiving voice calls), but may instead take the form of devices that only utilizes wireless network resources in order to transmit or receive data; such devices may include IoT devices (e.g., smart appliances, thermostats, locks, smart speakers, lighting devices, smart receptacles, and the like).

The network environment 200 comprises one or more of the first base station 210 and/or the second base station 212 to which the first UE 202 may potentially connect to (also referred to as 'camping on,' 'attaching,' in the industry). Though network environment 200 is illustrated with both the first base station 210 and the second base station 212, one skilled in the art will appreciate that more or fewer base stations may be present in any particular network environment. Furthermore, the first base station and the second base station 212 may have any one or more components or features of the computing device 100 of FIG. 1. Each of the first base station 210 and the second base station 212 of the network environment 200 is configured to wirelessly communicate with UEs, such as the first UE 202 and/or other base stations (e.g., such as each other). In aspects, any of first base station 210 and the second base station 212 may communicate with one or more of the first UE 202 or each other using any wireless telecommunication protocol desired by a network operator, including but not limited to 3G, 4G, 5G, 6G, 802.11x and the like. However, in some aspects, signals from the first UE 202, the first base station 210, and/or the second base station 212 may be transmitted towards one another without being in direct communication with one another. For example, energy transmitted on blanked PRBs in the signals can cause interference between base stations and user equipment within a communications network as well as external networks by the energy transmissions in certain bands of the transmitted signals.

The network environment 200 comprises components of radio units on the first UE 202 and the first base station 210. As discussed previously, the term "radio unit" (RU) may refer to one or more software and hardware components that facilitate sending and receiving wireless radio frequency signals. A RU may convert digital to radio signals for outgoing transmissions and convert radio signals back into digital data for processing. The illustrated components for the radio unit of the first UE 202 may include a scheduler 220, a transceiver module 221, an amplifier 222, a selective filter 223, an antenna 224, and/or a controller 225. Similarly, the illustrated components for the radio unit on the first base station 210 may include a scheduler 230, a transceiver module 231, an amplifier 232, a selective filter 233, an antenna 234, and/or a controller 235. Additional components of the radio units may be present but are not illustrated and/or discussed for the sake of clarity. For example, it may be understood that the second base station 212 has similar components, although not illustrated.

The schedulers 220,230 help by efficiently allocating resources to ensure optimal performance and adherence to system constraints. Specifically, when dealing with blanked PRBs, the schedulers 220,230 must strategically manage the distribution of available PRBs to various users and services. Blanked PRBs are intentionally left unused to avoid interference and/or to meet certain regulatory requirements. By dynamically adapting to real-time conditions and considering the presence of blanked PRBs, the schedulers 220,230 help to optimize the use of available resources, maintain signal quality, and enhance the overall efficiency of the system. The schedulers 220,230 may communicate such PRB allocation information (e.g., scheduling data) to both the transceiver modules 221,231 and the controllers 225, 235. The scheduling data may include detailed information on which frequency ranges are assigned to active PRBs and which are assigned to blanked PRBs, along with timing and synchronization information. The schedulers 220,230 may send this scheduling data to the transceiver modules 221, 231, which may include a Digital Signal Processor (DSP) and/or a Digital to Analog Converter (DAC), to process and prepare a baseband signal, helping to ensure that active PRBs carry the intended data while blanked PRBs remain empty. The schedulers 220,230 may also send the same scheduling data to the controllers 225,235, which may use the scheduling data to dynamically adjust the selective filters 223,233.

The transceiver modules 221,231, which may include a DSP and/or a DAC, helps process and prepare a baseband signal for transmission based on the scheduling data provided by the schedulers 220,230. For example, the transceiver modules 221,231 may first receive scheduling data from the schedulers 220,230 specifying which PRBs are designated for active data transmission and which are blanked. The DSP may then take this scheduling data and process the baseband signal accordingly. For active PRBs, the DSP may modulate and encode the data, preparing it for transmission, while for blanked PRBs, it helps ensure that no data is transmitted. After the DSP processes the digital signal, it sends the prepared waveform to the DAC, which converts the digital baseband signal into an analog signal suitable for transmission. Once the analog signal is generated, it is sent to the amplifiers 222,232.

The amplifiers 222,232 may refer to a device that increases the power level (e.g., a power amplifier) of the analog signal received from the transceiver modules 221, 231 to help ensure that it can be effectively transmitted over the air. For example, the amplifiers 222,232 may receive the analog signal, which may contain a first range of frequencies comprising blanked PRBs and a second range of frequencies comprising non-blanked PRBs. Upon receiving the analog signal, the amplifiers 222,232 may increase the power (e.g., amplify the waveform) of both the blanked and non-blanked PRBs uniformly. Despite any initial filtering or preparation by the transceiver modules 221,231, the amplified waveform may still include unwanted energy transmissions on the blanked PRBs. These residual energy transmissions can result from spectral leakage, sidelobes from modulation techniques, and/or the imperfect performance of the amplifiers 222,232, such as nonlinearity. Without further filtering, this unwanted energy in the blanked PRBs may lead to increased interference and reduced signal quality. Therefore, while the amplifiers 222,232 help boost the signal transmission, they also highlight the need of post-amplification filtering to remove any residual energy in the blanked PRBs.

In order to filter and remove residual energy in the blanked PRBs, operators may implement a selective filter such as the selective filters 223,233. The selective filters 223,233 may help by removing unwanted energy transmission from the blanked PRBs (e.g., the first range of frequencies) while preserving the integrity of the active PRBs (e.g., the second range of frequencies). This may require new hardware or a retooling of existing hardware that can be dynamically adjusted to specific frequency ranges identified in the scheduling data.

Upon receiving the amplified waveform from the amplifiers 222,232, the selective filters 223,233 may employ bandpass filters, bandstop filters, or a combination of both filters to achieve the desired signal refinement. For example, a bandpass filter may allow the second range of frequencies, corresponding to non-blanked PRBs that contain the intended transmission data, to pass through with little to no attenuation. This helps ensure that the active PRBs are transmitted with their amplified power levels intact, maintaining the quality and strength of the desired signal. A bandstop filter may attenuate the first range of frequencies associated with the blanked PRBs. By selectively filtering the amplified waveform to attenuate the first range of frequencies, the bandstop filter may help remove any residual energy that was amplified, thus preventing it from causing interference. Such a dual-filter approach by the selective filters 223,233 may help ensure that only the desired frequency components of the amplified waveform are transmitted while unwanted frequencies are significantly reduced or eliminated. The selective filters 223,233 may accomplish this by dynamically adjusting its filtering parameters based on real-time scheduling data that is coordinated by the controllers 225,235. After filtering the amplified waveform, the selective filters 223,233 may send the filtered amplified waveform to the antennas 224,234. The antennas 224,234 may then transmit the filtered amplified waveform over the air to an intended recipient, who may receive a high-quality signal with minimal interference. This selective filtering process enhances the overall efficiency and reliability of the communications network by maintaining signal integrity and reducing the potential for interference with adjacent frequency bands.

The controllers 225,235 (e.g., selective filtering controllers) may help dynamically manage and direct the selective filtering of the amplified waveform to help ensure optimal signal quality and minimize interference. The controllers 225,235 may be a newly added component or may be integrated into an existing component, such as the schedulers 220,230 or the selective filters 223,233. The controllers 225,235 described herein may be implemented as hardware, software, or a combination of both. As discussed previously, the controllers 225,235 may receive scheduling data from the schedulers 220,230, which may include detailed information about the allocation of PRBs. For example, this scheduling data may specify which frequencies correspond to blanked PRBs (e.g., the first range of frequencies) and which correspond to non-blanked PRBs (e.g., the second range of frequencies). In some aspects, the scheduling data may include digital signal data that the controllers 225,235 analyze to determine the allocation of PRBs. Using the scheduling data, the controllers 225,235 may make informed decisions on how to apply selective filtering to the amplified waveform. The process of selective filtering may involve predicting which frequencies need to be attenuated and which need to be preserved (e.g., allowed to pass through) based on the scheduling data.

The controllers 225,235 may coordinate and direct the selective filters 223,233 to implement these filtering decisions. For example, the controllers 225,235 may configure one or more bandpass filters to allow the non-blanked PRBs (e.g., the second range of frequencies) to pass through without being attenuated. Additionally, or alternatively, the controllers 225,235 may configure one or more bandstop filters to attenuate the blanked PRBs (e.g., the first range of frequencies), helping to remove any unwanted residual energy that could cause interference.

To enhance its decision-making capabilities, the controllers 225,235 may incorporate a machine learning component. For example, this component of the controllers 225, 235 may continuously monitor the results of the selective filtering process, analyzing the effectiveness of the current selective filtering strategies. By learning from the outcomes, the machine learning component can improve the predictions of the controllers 225,235 over time, becoming more adept at identifying which frequencies need to be filtered and how to adjust the filtering parameters dynamically. In such aspects, the controllers' 225,235 ability to predict and adjust filtering in real-time, based on both scheduling data and learned experiences, helps ensure that the communications network operates efficiently and reliably. By effectively coordinating the selective filters 223,233, the controllers 225,235 help maintain high signal quality, reduce interference, and enhance the overall performance of the network. This intelligent management of the selectively filtering process may help the system adapt to changing conditions and continuously optimize its operation for better outcomes.

Figure 3:
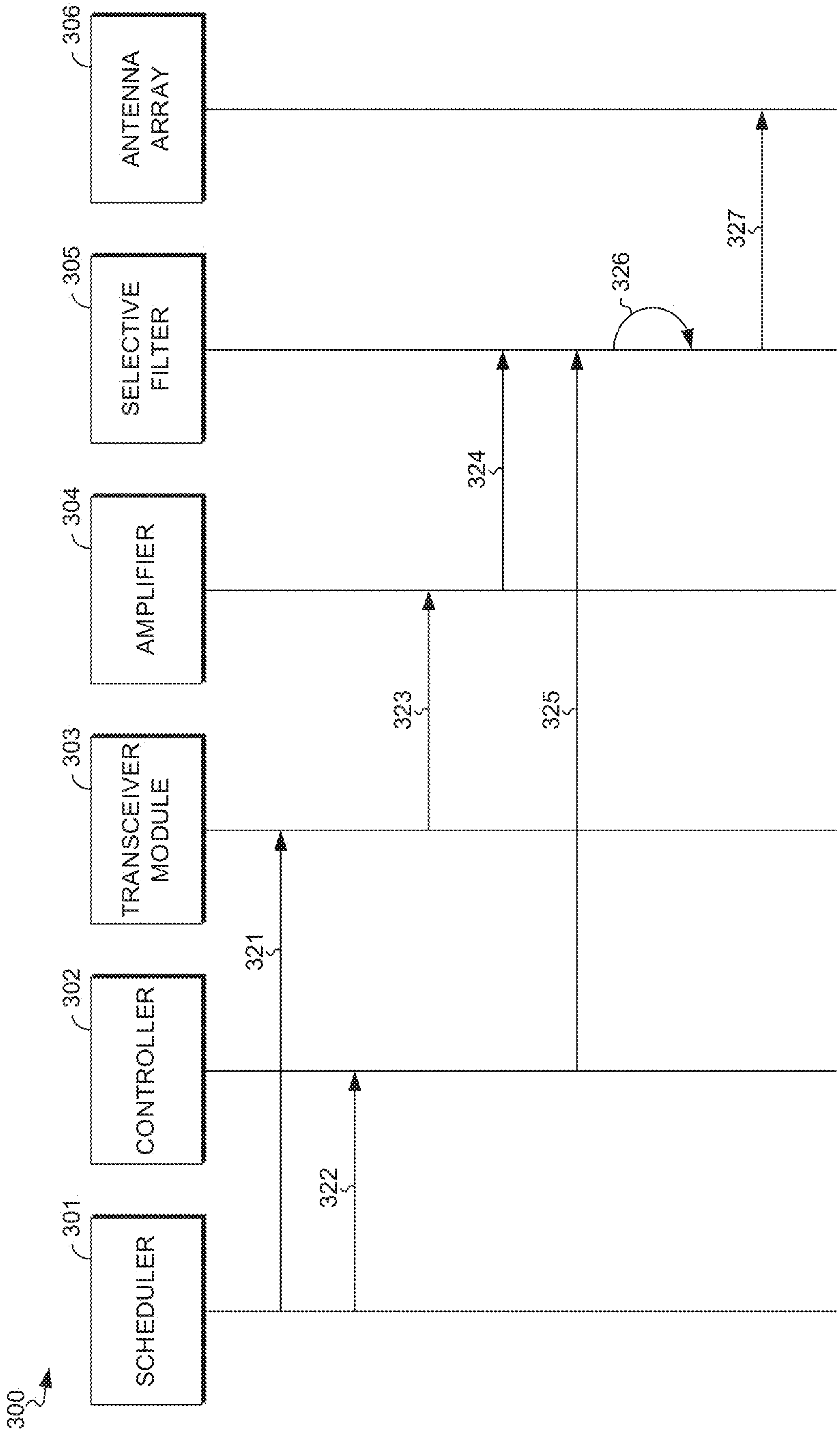
FIG. 3 illustrates an exemplary flow diagram for mitigating energy transmission in which implementations of the present disclosure may be employed.

FIG. 3 illustrates an example flow diagram for mitigating energy transmitted on subcarriers in a communications network in accordance with aspects herein. The components discussed may be the same or similar to previous components discussed with regards to FIGS. 1-2. At a first step 321, a scheduler 301 may determine the allocation of PRBs in a waveform intended for an upcoming transmission cycle and decide which PRBs will be active (e.g., non-blanked PRBs) and which will be blanked PRBs. The scheduler 301 may prepare detailed scheduling data, which may include frequency ranges for both the active and blanked PRBs in the waveform. The scheduler 301 may then send the scheduling data to the transceiver module 303. At a second step 322, the scheduler 301 may send the scheduling data to a controller 302 where the controller 302 may analyze the data and determine which frequencies correspond to blanked PRBs (e.g., the first range of frequencies) and which correspond to non-blanked PRBs (e.g., the second range of frequencies) in the waveform.

At a third step 323, a DSP in the transceiver module 303 may process the baseband signal according to the scheduling data and send the processed digital signal to a DAC. The DAC may convert the digital signal into an analog signal (e.g., waveform) suitable for transmission. The transceiver module 303 may then send the prepared analog signal to an amplifier 304. At a fourth step 324, the amplifier 304 boosts the power (e.g., uniformly) of the waveform to produce an amplified waveform, which may result in an increased power level of both the blanked and non-blanked PRBs. While this amplification helps ensure that the amplified waveform is strong enough for effective transmission, it may introduce unwanted energy in the blanked PRBs.

At a fifth step 325, the controller 302 may coordinate and direct a selective filter 305 to apply the appropriate bandpass and/or bandstop filters to the amplified waveform based on the determinations the controller 302 made regarding which range of frequencies comprise blanked PRBs and which range of frequencies comprise non-blanked PRBs. As discussed previously, the controller 302 may incorporate a machine learning component to monitor the results of the selective filtering and improve its predictions for future adjustments. At a sixth step 326, the selective filter 305, configured by the controller 302, selectively filters the amplified waveform. For example, the selective filter may apply a bandpass filter to allow the desired frequencies (e.g., non-blanked PRBs) to pass and a bandstop filter to attenuate the unwanted frequencies (e.g., blanked PRBs). At a seventh step 327, the filtered amplified waveform is then sent to an antenna 306 where the antenna 306 transmits the filtered amplified waveform over the air.

Figure 4:
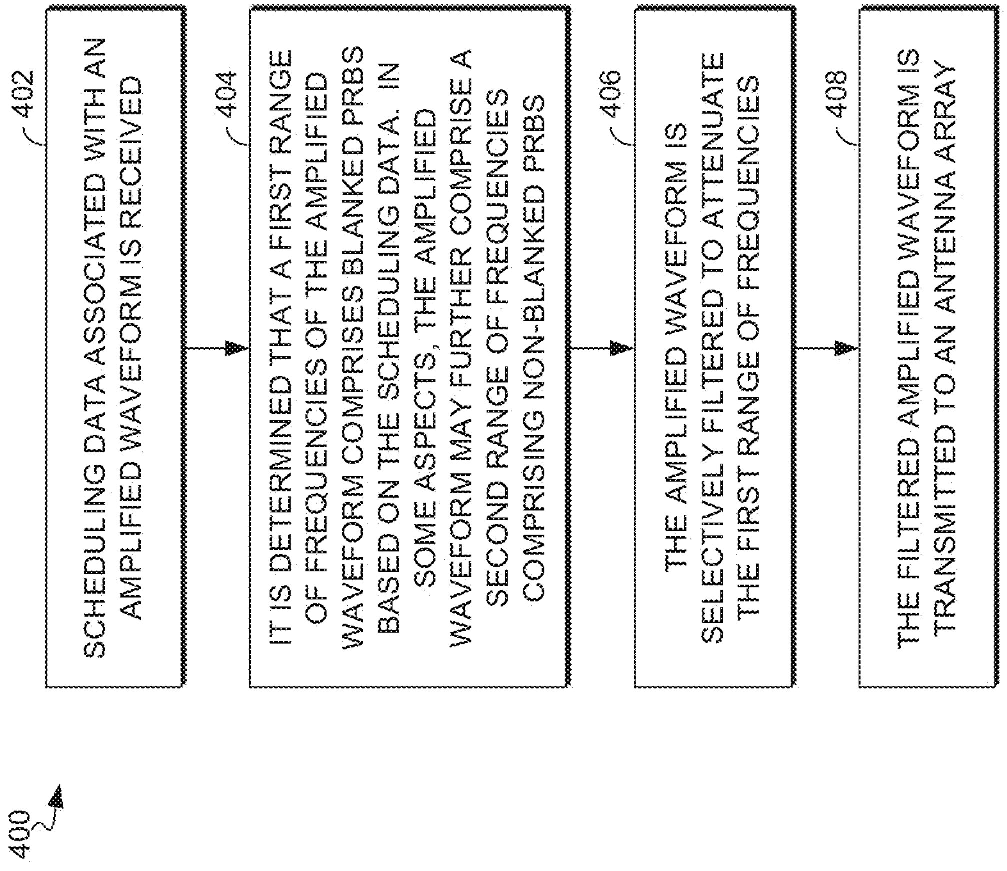
FIG. 4 illustrates a flow chart of an exemplary method for mitigating energy transmission in which implementations of the present disclosure may be employed.

Turning now to FIG. 4, a flow chart is provided that illustrates one or more aspects of the present disclosure relating to a method 400 for mitigating energy transmitted on subcarriers in a communications network. At a first step 402, scheduling data associated with an amplified waveform is received. At a second step 404, it is determined that a first range of frequencies of the amplified waveform comprises blanked PRBs based on the scheduling data. In some aspects, the amplified waveform may further comprise a second range of frequencies comprising non-blanked PRBs. At a third step 406, the amplified waveform is selectively filtered to attenuate the first range of frequencies. At a fourth step 408, the filtered amplified waveform is transmitted to an antenna array.

Figure 5:
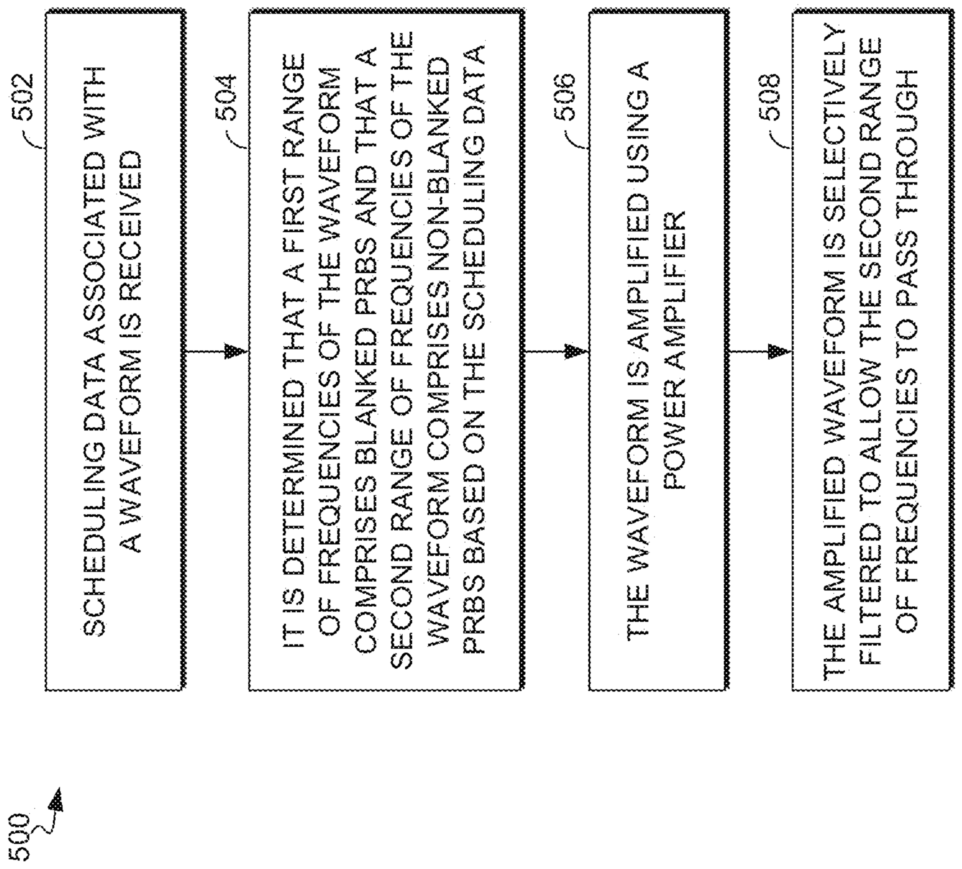
FIG. 5 illustrates a flow chart of an exemplary method for mitigating energy transmission in which implementations of the present disclosure may be employed.

Turning now to FIG. 5, a flow chart is provided that illustrates one or more aspects of the present disclosure relating to a method 500 for mitigating energy transmitted on subcarriers in a communications network. For example, at a first step 502, scheduling data associated with a waveform is received. At a second step 504, it is determined that a first range of frequencies of the waveform comprises blanked PRBs and that a second range of frequencies of the waveform comprises non-blanked PRBs based on the scheduling data. At a third step 506, the waveform is amplified using a power amplifier. At a fourth step 508, the amplified waveform is selectively filtered to allow the second range of frequencies to pass through.

Figure 6:
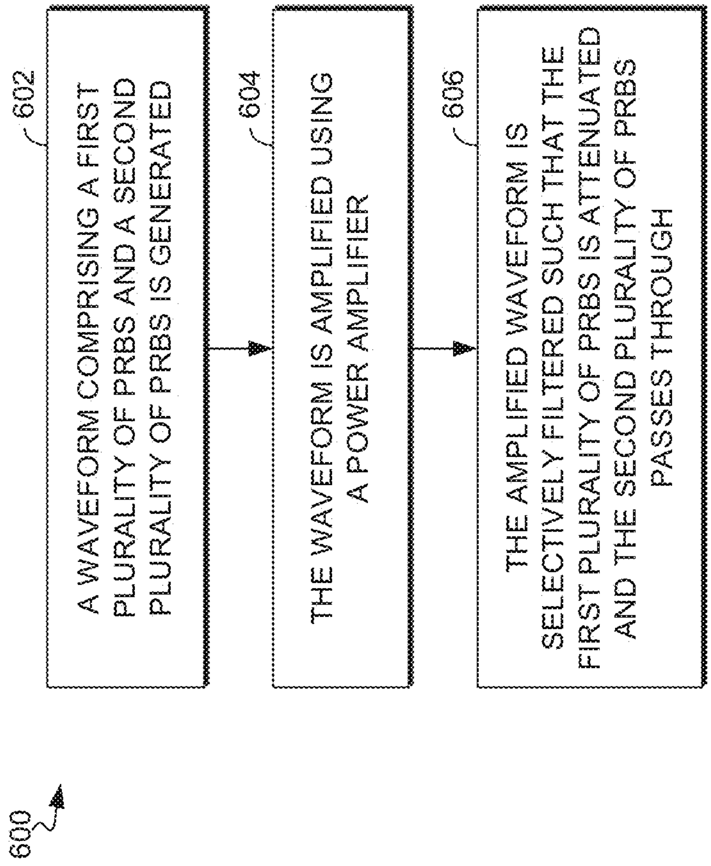
FIG. 6 illustrates a flow chart of an exemplary method for mitigating energy transmission in which implementations of the present disclosure may be employed.

Turning now to FIG. 6, a flow chart is provided that illustrates one or more aspects of the present disclosure relating to a method 600 for mitigating energy transmitted on subcarriers in a communications network. For example, at a first step 602, a waveform comprising a first plurality of PRBs and a second plurality of PRBs is generated. At a second step 604, the waveform is amplified using a power amplifier. At a third step 606, the amplified waveform is selectively filtered such that the first plurality of PRBs is attenuated and the second plurality of PRBs passes through.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for mitigating energy transmitted on subcarriers in a communications network, the system comprising:
- a radio unit;
- a network device comprising one or more processors; and
- a non-transitory computer-readable media comprising executable instructions that, when executed, causes the network device to perform operations in the communications network, the executable instructions comprising the steps of:
- receiving scheduling data associated with an amplified waveform generated by the radio unit;
- determining, based on the scheduling data, that a first range of frequencies of the amplified waveform comprises blanked Physical Resource Blocks (PRBs);
- selectively filtering the amplified waveform to attenuate the first range of frequencies; and
- transmitting the filtered amplified waveform to an antenna array.

2. The system of claim 1, wherein the radio unit comprises a power amplifier, and wherein the amplified waveform is amplified using the power amplifier.

3. The system of claim 1, where the amplified waveform is selectively filtered using a bandstop filter.

4. The system of claim 1, wherein the antenna array is a component of the radio unit.

5. The system of claim 1, wherein the scheduling data comprises digital signal data associated with the amplified waveform.

6. The system of claim 5, wherein the first range of frequencies is determined to comprise blanked PRBs based on the digital signal data.

7. The system of claim 1, wherein the amplified waveform further comprises a second range of frequencies comprising non-blanked PRBs.

8. The system of claim 7, wherein selectively filtering the amplified waveform comprises using a bandpass filter to allow the second range of frequencies to pass through.

9. The system of claim 1, wherein the amplified waveform is generated by a digital-to-analog Converter (DAC) of the radio unit on a user equipment or a base station.

10. The system of claim 1, wherein the network device is a selective filtering controller on a user equipment or a base station.

11. A non-transitory computer-readable media comprising executable instructions that, when executed, causes a network device comprising one or more processors to perform operations for mitigating energy transmitted on subcarriers in a communications network, the executable instructions comprising the steps of:
- receiving scheduling data associated with a waveform;
- determining, based on the scheduling data, that a first range of frequencies of the waveform comprises blanked Physical Resource Blocks (PRBs) and that a second range of frequencies of the waveform comprises non-blanked PRBs;
- amplifying the waveform using a power amplifier; and selectively filtering the amplified waveform to allow the second range of frequencies to pass through.

12. The computer-readable media of claim 11 further comprising transmitting the filtered amplified waveform to an antenna array.

13. The computer-readable media of claim 11, where the amplified waveform is selectively filtered using a bandstop filter.

14. The computer-readable media of claim 11, wherein the scheduling data comprises digital signal data associated with the amplified waveform.

15. The computer-readable media of claim 11, wherein selectively filtering the amplified waveform further comprises using a bandstop filter to attenuate the first range of frequencies.

16. The computer-readable media of claim 11, wherein the waveform is generated by a digital-to-analog Converter (DAC) of a radio unit on a user equipment or a base station.

17. The computer-readable media of claim 11, wherein the power amplifier is a component of a radio unit on a user equipment or a base station.

18. A method for mitigating energy transmitted on subcarriers in a communications network, the method comprising:

generating a waveform, the waveform comprising a first plurality of Physical Resource Blocks (PRBs) and a second plurality of PRBs;

amplifying the waveform using a power amplifier; and selectively filtering the amplified waveform such that the first plurality of PRBs is attenuated and the second plurality of PRBs passes through.

19. The method of claim 18, wherein the first plurality of PRBs comprises only blanked PRBs.

20. The method of claim 18 further comprising transmitting the filtered amplified waveform to an antenna array.

* * * * *